US006125187A

United States Patent [19]

Hanajima et al.

[11] Patent Number: 6,125,187

[45] Date of Patent: Sep. 26, 2000

[54] HOWLING ELIMINATING APPARATUS

[75] Inventors: Mitsuru Hanajima, Saitama; Michiaki Yoneda; Toshiyuki Okuma, both of Kanagawa, all of Japan

[73] Assignee: Sony Corporation, Tokyo, Japan

[21] Appl. No.: 09/327,765

[22] Filed: Jun. 7, 1999

Related U.S. Application Data

[63] Continuation of application No. PCT/JP98/04744, Oct. 20, 1998.

[30] Foreign Application Priority Data

Oct. 20, 1997 [JP] Japan .................................... 9-287139

[51] Int. Cl.$^{7}$ ..................................................... H04B 15/00

[52] U.S. Cl. ................................................ 381/83; 381/93

[58] Field of Search ............................... 381/93, 83, 318; 379/406, 410

[56] References Cited

U.S. PATENT DOCUMENTS

| | | | |
|---|---|---|---|
| 5,442,712 | 8/1995 | Kawamura et al. | 381/83 |
| 5,649,019 | 7/1997 | Tomasson | 381/83 |
| 5,677,987 | 10/1997 | Seki et al. | 395/2.35 |
| 5,910,994 | 6/1999 | Lane et al. | 381/93 |
| 5,999,631 | 12/1999 | Porayath et al. | 381/93 |

FOREIGN PATENT DOCUMENTS

| | | | |
|---|---|---|---|
| 8-50491 | 2/1996 | Japan | G10K 11/178 |
| 8-84394 | 3/1996 | Japan | H04R 3/02 |
| 8-130792 | 5/1996 | Japan | H04R 3/02 |
| 8-321796 | 12/1996 | Japan | H04B 3/23 |

*Primary Examiner*—Forester W. Isen
*Assistant Examiner*—Brian Tyrone Pendleton
*Attorney, Agent, or Firm*—Limbach & Limbach LLP

[57] ABSTRACT

Disclosed howling eliminating apparatus comprises frequency analyzing means 32 for detecting a frequency which causes howling, band eliminating means 20 for eliminating a band including the howling frequency detected by the frequency analyzing means, and controlling means 30 for controlling both the frequency analyzing means and the band eliminating means in their characteristics. The frequency analyzing means is controlled to divide input frequencies into a plurality of wide bands, detect howling status in each of the divided wide bands to isolate one wide band suspected to include the howling frequency. When the one wide band causing the howling is isolated, the frequency analyzing means divides the suspected wide band into a plurality of narrow bands, and detects the howling frequency in one of the narrow bands. The band eliminating means is controlled to eliminate the narrow band including the howling frequency. The apparatus thus shortens the time it takes to detect howling with a minimum of hardware.

7 Claims, 5 Drawing Sheets

HOWLING ELIMINATING APPARATUS

This application is a continuation of international application No. PCT JP/98/04744 filed Oct. 20, 1998, now pending.

TECHNICAL FIELD

The present invention relates to a howling eliminating apparatus. More particularly, the invention relates to a howling eliminating apparatus which, upon detecting a howling frequency, first sets to divide a frequency range into wide bands, checks each of the widely divided bands so as to isolate the band suspected to include the howling frequency therein, divides the widely divided band into narrower bands when the band including howling frequency is isolated, checks the narrowly divided bands so as to detect the howling frequency from each of the narrowly divided bands, thereby to implement the detection of howling and the elimination of the detected howling, without increasing the scale of circuitry.

BACKGROUND ART

Musical performances by vocalists and/or musical instruments may be picked up by microphones in a place such as concert hall and then the picked up signal may be reproduced by a speaker. In such cases, howling is sometimes experienced between the microphones and speakers.

To eliminate the howling when the howling is generated, it is necessary to furnish a loudspeaker system with means to detect a howling frequency in advance and to attenuate the band including the howling frequency. Such means incorporated in the loudspeaker system is generally called as a howling eliminating apparatus.

A typical howling eliminating apparatus comprises microphones and speakers making up a loudspeaker system, frequency analyzing means for analyzing a howling frequency, and band eliminating means for attenuating a band including the howling frequency. The frequency analyzing means detects the howling frequency, and the band eliminating means has its frequency characteristic adjusted to attenuate the howling frequency thus acquired.

The frequency analyzing means has frequency analyzing filters composed of band-pass filters. The band eliminating means generally comprises band attenuating filters or band limiting filters.

The frequency component that develops howling consists of a single frequency. This means that to eliminate solely a howling frequency without deteriorating transmission quality requires making each of the bands assigned to the band elimination filters as narrow or as steep as possible.

To permit a band of a band elimination filter to be narrow, it is necessary that the frequency analyzing filters for detecting the howling frequency also have narrow (i.e., identical) bands. However, the requirement entails providing many divided bands (a high band count) for howling detection. Some loudspeaker systems have as many as 120 divided bands set on their filters. Such arrangements are bound to be costly.

Conventionally, with equivalence between deterioration of sound quality and processing time, the frequency analyze filters is so arranged as to handle a transmission band of 20 Hz through 20 kHz as the transmission band for analyzing the howling frequency and to allow each band to be a ⅙ octave band uniformly over the 20 Hz to 20 kHz band.

It is well known, however, that the band necessary for voice transmission ranges from 100 Hz to 10 kHz. That is, the frequency components unnecessary for voice transmission, i.e., frequencies below 100 Hz and above 10 kHz, are conventionally included in the band subject to howling detection. This results in a prolonged processing time for the howling detection and the elimination thereof.

Because the band elimination filters are arranged as a ⅙ octave band, they tend to attenuate the frequency components that need not be eliminated in substance. This causes deterioration in transmission quality.

In addition, conventional howling eliminating apparatus judges a howling phenomenon using a maximum signal level (absolute value) within each divided frequency band as a criterion for the judgment of a generation of the howling phenomenon. In this case, to raise the sensitivity for howling detection, it requires lowering the maximum signal level, i.e., the absolute value subject to detection. With the absolute value reduced, the sensitivity for howling detection is more likely to be affected by background noise in the installation environment of the hall or like where the loudspeaker system is installed. Illustratively, higher levels of background noise in the hall make it more liable for the apparatus to make an erroneous judgment of howling apeneration. Thus to raise the howling detection sensitivity, it requires conducting repeated adjustments to avert such faulty detection. The adjustments are complicated and are difficult to accomplish.

It is therefore a principal object of the present invention to overcome such the deficiencies of the prior art and to provide a howling eliminating apparatus capable of accurately detecting howling frequencies without increasing the scale of its circuitry.

DISCLOSURE OF INVENTION

A howling eliminating apparatus according to one aspect of the invention, comprises frequency analyzing means for detecting a frequency causing howling, band eliminating means for eliminating a band including the howling frequency detected by the frequency analyzing means, and controlling means for controlling both the frequency analyzing means and the band eliminating means in their characteristics, wherein the frequency analyzing means is controlled to divide input frequencies into a plurality of wide bands, detect howling status in each of the divided wide bands to isolate one wide band suspected to include the howling frequency, divide the suspected wide band into a plurality of narrow bands when the one wide band causing the howling is isolated, and detect the howling frequency in one of the narrow bands, and wherein the band eliminating means is controlled to eliminate the narrow band including the howling frequency.

As outlined, in the invention, the howling eliminating apparatus is so arranged as to be able to divide frequency bands of the same frequency analyzing means into two tiers of frequency bands (i.e., wide and narrow) and use them. In the first tier, The frequency analyzing means acts as wide band frequency analyzing filters to detect one wide band suspected to contain howling. When detected, the suspected wide band is divided into a plurality of narrow bands and the howling is detected within each of the narrowly divided frequency bands.

When one of the narrow frequency bands is judged to contain howling, the frequency detected at that point is considered as the howling frequency. The frequency characteristic of the band eliminating means is then established so that the howling frequency is fully attenuated.

BEST MODE FOR CARRYING OUT THE INVENTION

An embodiment of a howling eliminating apparatus relating to the invention, which is applied to a loudspeaker system, will now be described in detail with reference to the accompanying drawings.

Figure 1:
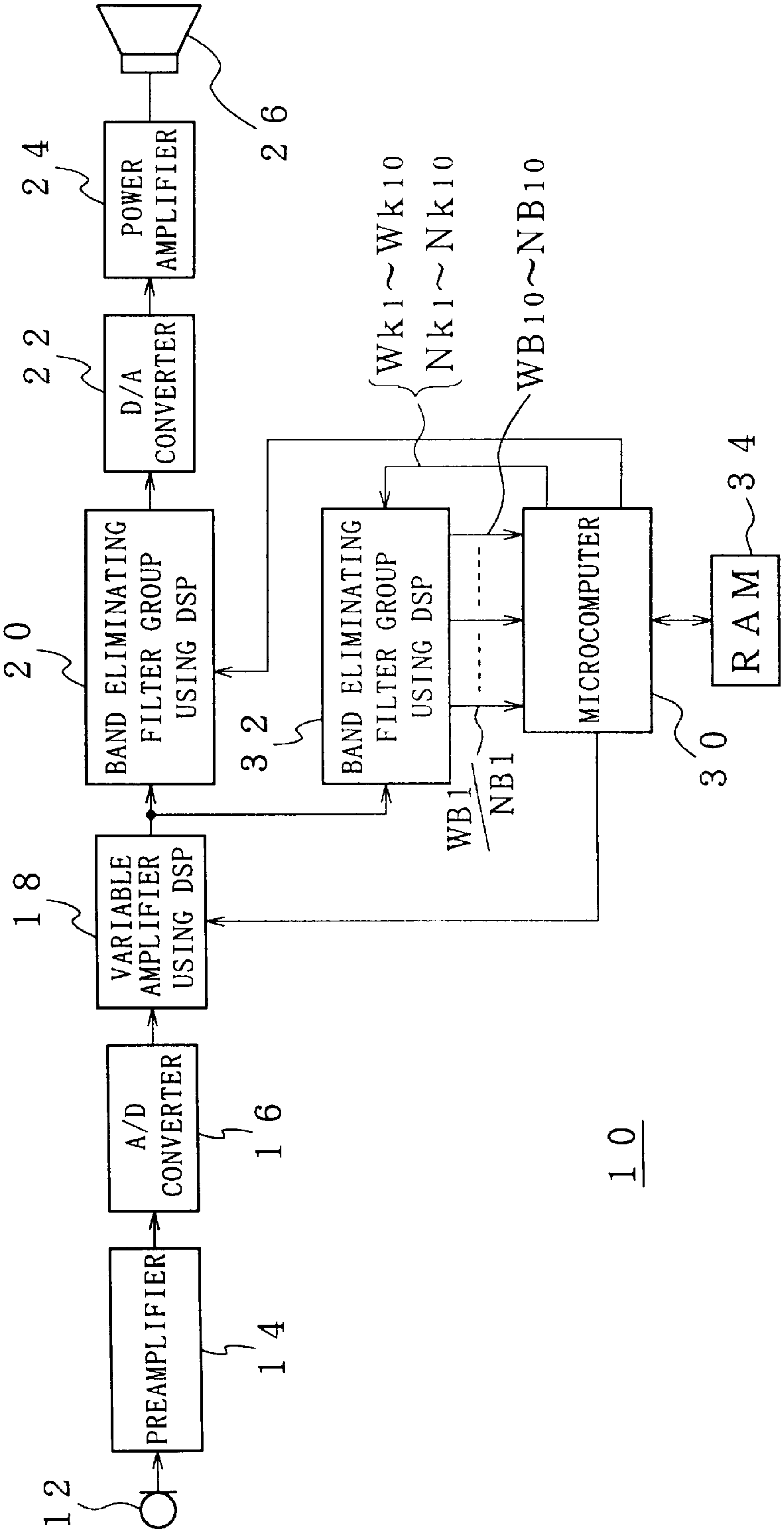
FIG. 1 is a partial schematic flow diagram showing a howling eliminating apparatus as an embodiment of the invention.

FIG. 1 shows an embodiment of the howling eliminating apparatus 10 relating to the invention, the apparatus constituting as a whole a loudspeaker system. A signal picked up by microphones 12 is fed through a preamplifier 14 to an A/D converter 16 where the picked up signal is converted to a digital signal. The digital signal is supplied through a variable amplifier 18 to a band eliminating filter group 20. The band eliminating filter group 20 is provided to attenuate a howling-forming frequency precipitously. Details of the attenuating operation will be discussed later.

The digital signal having its howling frequency attenuated is converted by a D/A converter 22 back to the original analog signal. Then, the analog signal is amplified by a power amplifier 24 before being outputted acoustically by speakers 26.

The variable amplifier 18 and the band eliminating filter group 20 are respectively controlled in the gain thereof, its band characteristics and so on, based on control signals from controlling means 30 constituted by a microcomputer. Part of the output from the variable amplifier 18 is supplied to a band-pass filter group 32 forming frequency-analyzing means. The output of the filter group 32 is fed to the controlling means 30 whereby a howling frequency is detected. The value of the detected howling frequency is stored into memory means 34 such as a RAM.

The variable amplifier 18, band eliminating filter group 20 and band-pass filter group 32 are all made up of digital signal processors (DSPs). Their gain and filter characteristics are controlled (i.e., established) by control signals from the microcomputer 30. In this example, IIR (infinite impulse response) type digital filters are employed.

Figure 2:
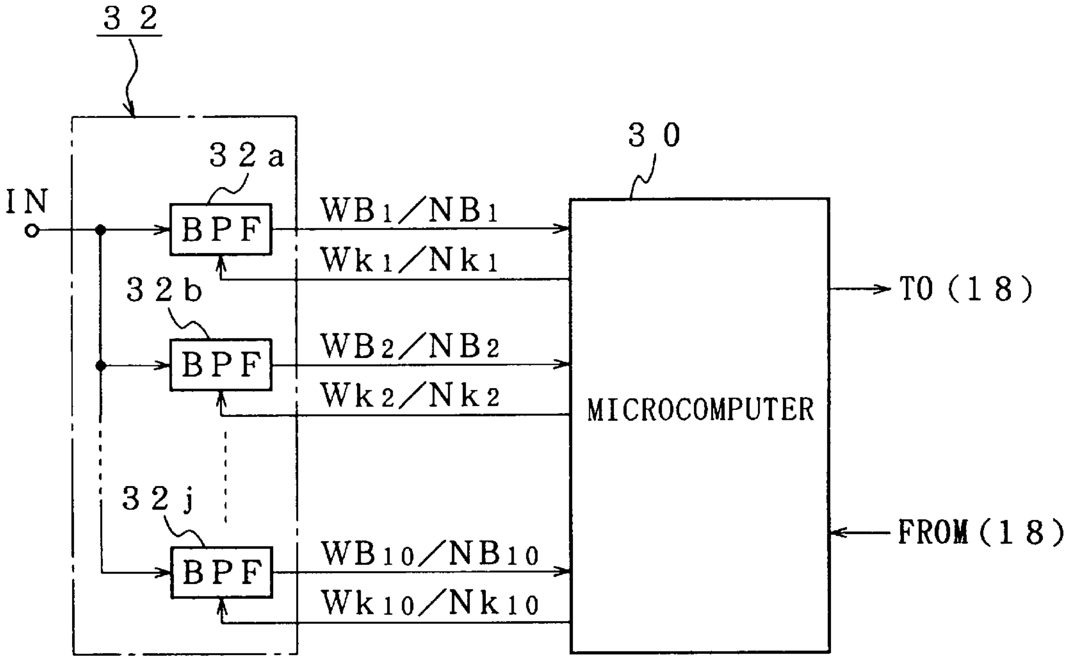
FIG. 2 is a partial schematic flow diagram showing a band-pass filter as an embodiment of the invention.

FIG. 2 depicts an embodiment of the band-pass filter group 32. In this setup, frequency bands such that they are not associated with the deterioration of transmission quality are omitted from frequency bands, in order to check for howling frequencies.

Conventionally, the frequency band ranging from 20 Hz to 20 kHz has been selected as the band subject to howling detection. Of the transmission frequencies constituting the band, those below 100 Hz and above 10 kHz are frequency components that do not affect transmission quality (see FIG. 3) . For that reason, the band-pass filters are arranged to omit these upper and lower frequency components; only the remaining frequency components are subject to the howling detection.

To remove in advance the frequency bands that do not affect transmission quality permits reducing the number of band-pass filters for howling detection and thereby shortening the processing time (i.e., howling detection time) . For example, suppose that the entire transmission band is divided into 100 bands to be processed (for howling detection) . In that case, 10 divided bands at the lower end of the entire transmission band and another 10 on the upper end thereof are removed beforehand as unnecessary bands for a loudspeaker system. This leaves only 80 bands to be processed, which translates into a 20 percent reduction in the scope of required circuitry and in processing time, respectively.

Figure 3:
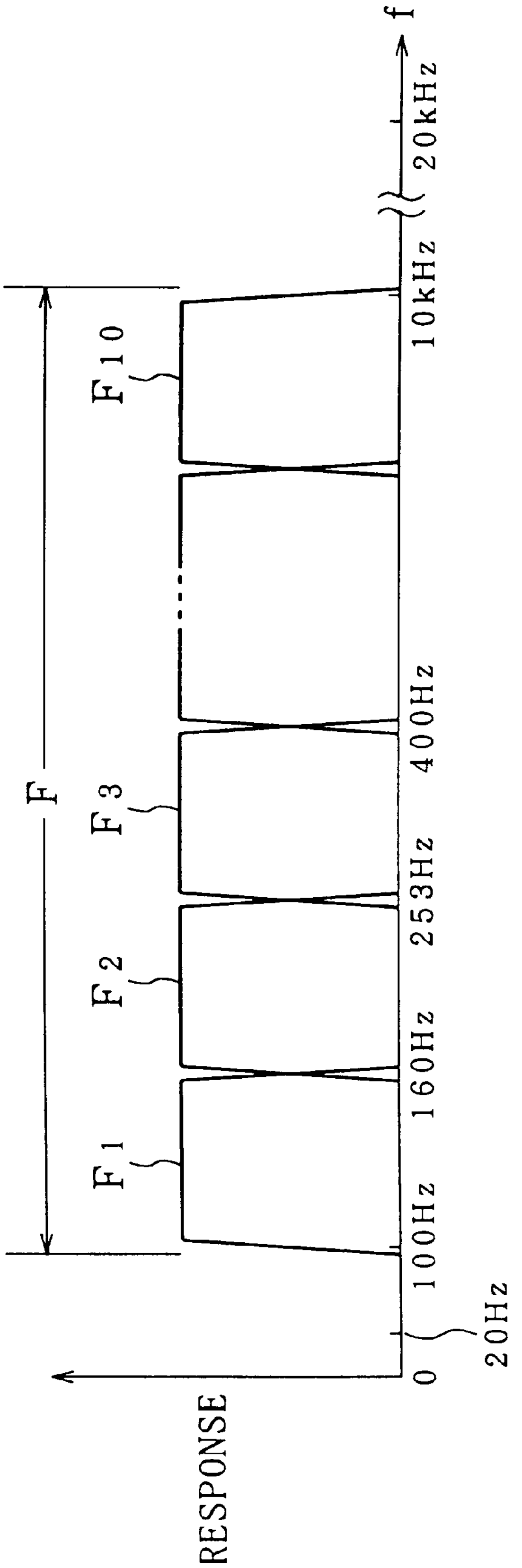
FIG. 3 is a schematic view showing wide band characteristics.

In the example of FIG. 3, a pass band F is divided into 10 bands F1 through F10 for purpose of simplification and illustration. As a result, the band-pass filter group 32 constitutes 10 band-pass filters 32*a* through 32*j* as shown in FIG. 2. The output of each of these filters is supplied to the microcomputer 30.

According to the invention, two kinds of bandwidths are set as bandwidths to be passed of the band-pass filters 32*a* through 32*j*. First, the band-pass filters 32*a* through 32*j* are assigned to wide band characteristics in order to implement the coarse howling detection. One of the widely divided bands is selected as a band suspected to generate the howling. The pass band suspected to generate the howling is then divided into 10 narrow bands. For this reason, the 10 band-pass filters 32*a* through 32*b* are set this time for their narrow band characteristics.

More specifically, there are first provided widely divided bands F1 through F10 as shown in FIG. 3. In this case, the bands are evenly divided in logarithm, not in frequency. Specific values are indicated in FIG. 3.

Figure 4:
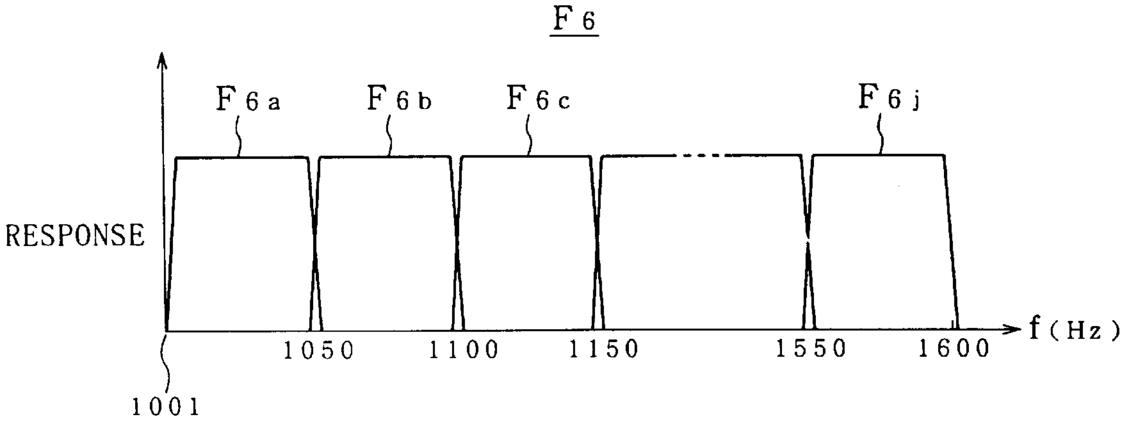
FIG. 4 is a schematic view depicting narrow band characteristics.

Each of the widely divided bands is checked for generating the howling. Suppose that the howling is found to have been generated illustratively in the band F6 (pass bandwidth: 1001 Hz to 1600 Hz), then the band F6 is divided into 10 narrow bands F6*a* through F6*j* (see FIG. 4). Each of the narrowly divided bands is checked further for generating the howling.

The processing above is aimed at achieving two objectives: to performing a quickly howling detection, and to raise the accuracy of howling detection.

The band-pass filters 32 are constituted by digital filters comprising DSPs. As such, the divided filters 32*a* through 32*j* have their filter coefficients set by the microcomputer 30 so that the bands to be analyzed maybe set either to the wide bands or the narrow ones.

Therefore, the microcomputer 30 initially sends wide band filter coefficients Wk1 through Wk10 to the band-pass filters 32*a* through 32*j* to set its filter coefficient such that the latter will function as wide band filters. In order to have one of the widely divided bands, which is judged to include the howling frequency, divided to narrow bands, the microcomputer 30 sends narrow band filter coefficients Nk1 through Nk10 to the band-pass filter 32*a* through 32*j* to set its filter coefficient.

The fact that the same band-pass filter is used for both wide band and narrow band filters means that the hardware involved therein is much simplified. Further, in operation, a given transmission frequency band is divided into 10 wide bands whose frequency components are taken in and processed by the 10 widely divided band-pass filters. The analysis process for howling is carried out in the frequency components in the band judged to include the howling frequency by means of the 10 now-narrowly-divided band-pass filters. This means the processing of 100 frequency bands is replaced by that of 20 frequency bands. This translates into a fivefold increase of processing speed, whereby a quickly howling detection may be performed.

The presence or absence of howling is judged as follows: the inventive howling eliminating apparatus utilizes a relative level difference for howling detection. Specifically, the microcomputer 30 compares a mean value and a maximum value of frequency components in each divided band. When the discrepancy between the mean value and the maximum value is greater than a predetermined difference (e.g., 6 dB), the microcomputer 30 regards the data of the maximum value as inclusive of a howling frequency. Such judging steps are capable of averting erroneous detection, as howling, of background noise even when it is loud in the environment where the loudspeaker system is installed. An effect is obtained such that there is no need to adjust the detection level for enhancing detection accuracy while trying to avert faulty howling detection.

When a howling frequency is detected, the frequency value is stored in a RAM 34. At the same time, the filter coefficient to the band eliminating filter group 20 is set so as to attenuate the frequency in question precipitously.

Figure 5:
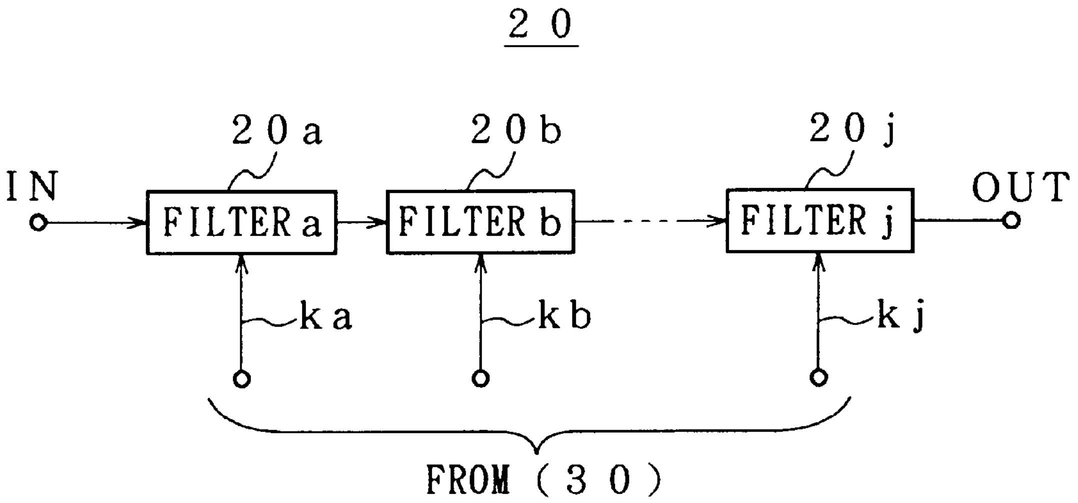
FIG. 5 is a partial schematic flow diagram showing a band eliminating filter as an embodiment of the invention.

The band eliminating filter group 20 is constituted by serially connected filters each forming a maximum size filter made of a single DSP. In the setup of FIG. 5, 10 filters (band limiting filters) 20*a* through 20*j* are used. Each of the filters 20*a* through 20*j* is arranged to have a 1/12 octave cut-off characteristic. The arrangement is intended to attenuate effectively the howling frequency alone.

Howling occurs at a single frequency. Under certain circumstances, a plurality of howling phenomena may develop simultaneously at a plurality of frequencies. In the latter case, a first filter 20*a* is set for an attenuation characteristic intended to attenuate a first howling frequency (i.e., the lowest detected frequency) . A filter coefficient "ka" that will bring about such attenuation characteristic is output by the microcomputer 30.

A second howling frequency is attenuated in like manner. In this case, a band attenuation characteristic of a second filter 20*b* is set by a filter coefficient "kb." Because 10 band eliminating filters are used in this example, up to 10 howling frequencies maybe attenuated. Obviously, a filter coefficient such that the frequency characteristic of the remaining filters becomes flat, is assigned to the remaining filters.

When howling frequencies are detected in the manner described, the detected frequencies are attenuated precipitously. This prevents the loudspeaker system from generating the howling without deteriorating transmission quality.

In practice, the gain of the variable amplifier 18 in FIG. 1 need only be increased gradually in order to detect howling. The gain may be adjusted either manually or automatically by the microcomputer 30. Typical steps of automatic gain adjustment are explained below.

The microcomputer 30 reads wide band signal outputs WB1 through WB10 from the band-pass filter group 32 while gradually raising the amplification degree (level) of the variable amplifier 18 using a DSP. In so doing, the microcomputer 30 isolates one of the band divisions in which howling is detected.

Once the frequency component responsible for howling is detected and isolated, the microcomputer 30 causes the band eliminating filters 20 to attenuate the band in question so as to eliminate the howling.

The steps above are repeated either until a predetermined amplification degree (level) is reached or until the band eliminating filters 20*a* through 20*j* (for 10 bands) of the band eliminating filter group 20 are exhausted. Thereafter, the amplification degree is reset to its initial value, which terminates the set procedure of howling elimination.

The relative distance between the microphones 12 and the speakers 26 varies depending on where the speakers 26 are positioned in the hall. The varying relative distances result in differences of the time required for the signal sound from the speakers 26 to be fed back to the microphones 12. Hence the time at which howling occurs varies. Meanwhile, where the gain of the variable amplifier 18 is controlled in the manner described above, the rate of change in the gain remains always constant. Thus when measurements are taken for howling detection, the feedback time should preferably be taken into account.

Howling detection may be optimized as follows: the feedback time is first measured. Then the gain cycle of the variable amplifier 18 (i.e., time it takes to vary the gain from 0 to its maximum) is adjusted on the basis of the measured feedback time.

Figure 6:
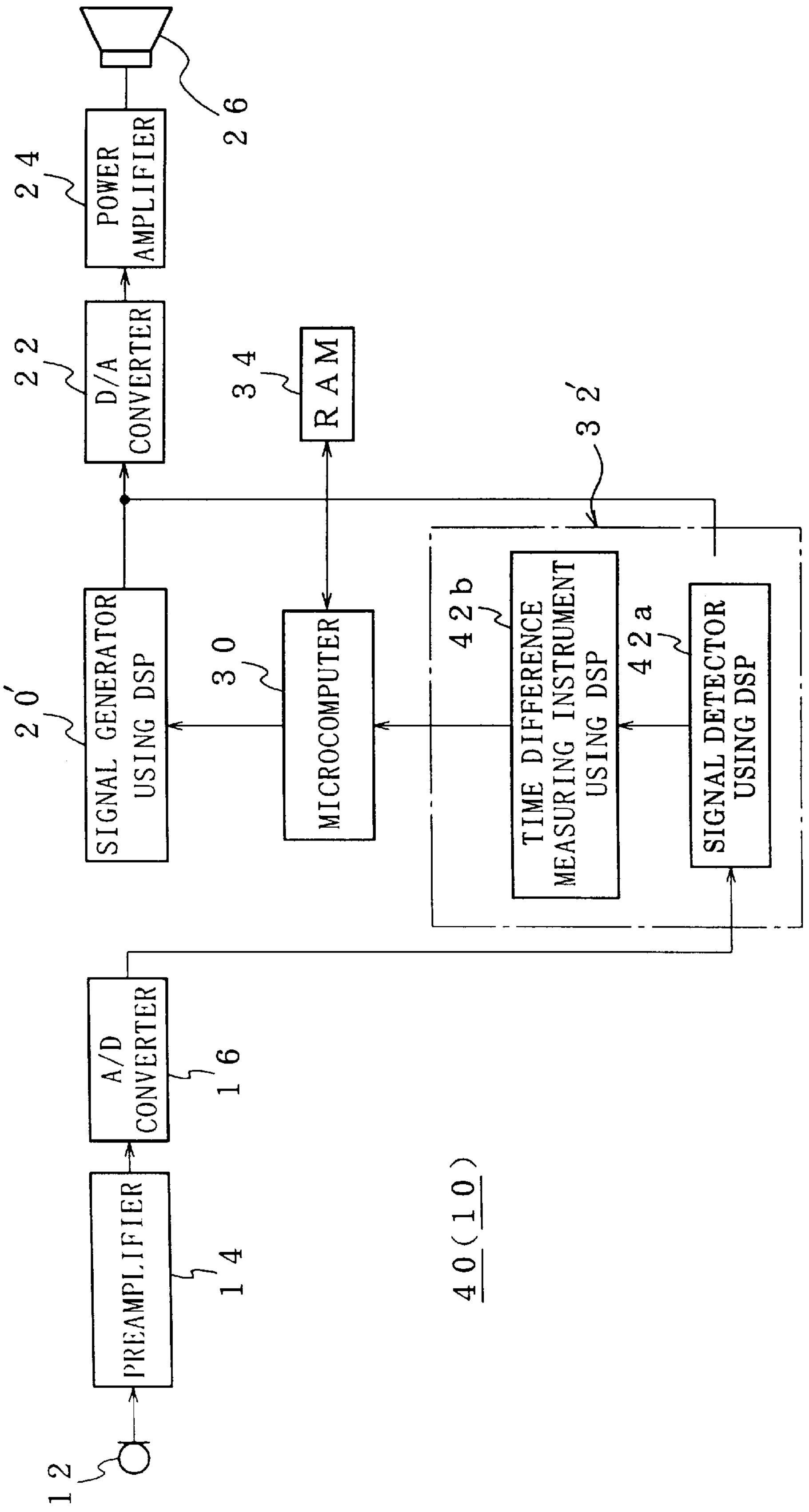
FIG. 6 is a partial schematic flow diagram showing a howling generation time detecting device as an embodiment of the invention.

Feedback time measurements may be taken by use of the howling eliminating apparatus of FIG. 1. This is because the band eliminating filter group 20 and the band-pass filter group 32 for frequency analysis are all composed of DSPS.

Where the howling eliminating apparatus 10 is to be utilized as a howling generation time detecting device, the band eliminating filter group 20 is used as a signal generator 20' and the band-pass filter group 32 as both a signal detector 42*a* and a time difference measuring instrument 42*b* as shown in FIG. 6.

The output of the signal generator 20' is output by the speakers 26 and the speaker output is picked up by the microphones 12. That is, the output of the signal generator 20' and that of the A/D converter 16 are both supplied to the signal detector 42*a*. for detection of the respective signals. The detected signals are sent to the time difference measuring instrument 42*b* whereby the time required for the sound output to reach the microphones 12 is measured. The time difference measuring instrument 42*b* may have only a counter function.

The feedback time thus measured is input to the microcomputer 30 whereby the gain cycle of the variable amplifier 18 controlled for howling detection is optimized. Specifically, where the relative distance between the microphones 12 and the speakers 26 is short and so is the feedback time, the gain cycle may be stepped up; whereas the relative distance is long, the gain cycle may be slowed correspondingly.

The detection of howling generation times and howling phenomena and the setting of the band attenuating filters are all processed by control programs stored illustratively in an internal ROM of the microcomputer 30.

As described, the howling eliminating apparatus according to the invention uses its frequency analyzing means with either wide band or narrow band characteristics. The scheme helps shorten the time for howling detection while keeping to a minimum the hardware structure of the frequency analyzing means. The inventive apparatus thus provides high-speed howling elimination without incurring cost increases.

INDUSTRIAL APPLICABILITY

The howling eliminating apparatus of the invention may be used advantageously to eliminate howling that may occur between microphones and speakers of a loudspeaker system installed in a concert hall or like places.

What is claimed is:

1. A howling eliminating apparatus comprising:

frequency analyzing means for detecting a frequency causing howling;

band eliminating means for eliminating a band including the howling frequency detected by said frequency analyzing means; and controlling means for controlling both said frequency analyzing means and said band eliminating means in their characteristics;

wherein said frequency analyzing means is controlled to divide input frequencies into a plurality of wide bands, detect a howling status of each of the wide bands to isolate one wide band suspected to include said howling frequency, divide the one wide band suspected to include said howling frequency into a plurality of narrow bands when the one wide band causing the howling is isolated, and detect said howling frequency in one of said narrow bands; and wherein said band eliminating means is controlled to eliminate the narrow band including said howling frequency.

2. The howling eliminating apparatus according to claim 1, wherein said frequency analyzing means and said band eliminating means are made of digital signal processors.

3. The howling eliminating apparatus according to claim 1, wherein said input frequencies to be analyzed are limited solely to frequency components necessary for transmission.

4. The howling eliminating apparatus according to claim 3, wherein said frequency components necessary for transmission are selected to be within a frequency band ranging from 100 Hz to 10 kHz.

5. The howling eliminating apparatus according to claim 1, wherein a difference between a mean value and a maximum value of signal levels within any given frequency band is detected so as to prevent erroneous howling detection caused by background noise, and wherein howling is judged to have occurred when said difference exceeds a predetermined signal level.

6. The howling eliminating apparatus according to claim 1, wherein, based on characteristic designating signals from said controlling means, said band eliminating means is used as signal generating means and said frequency analyzing means is used both as signal detecting means and as time difference measuring means;

wherein the time required for a signal generated by said signal generating means and output by speakers to return to microphones is measured by said time difference measuring means in order to predict a feedback time in which howling will occur, and wherein said controlling means utilizes the predicted feedback time to optimize a gain cycle of said frequency analyzing means during howling detection, whereby a howling elimination time is optimized.

7. The howling eliminating apparatus according to claim 1, further comprising a variable amplifier located upstream of said frequency analyzing means, wherein a gain adjusting cycle of said variable amplifier is controlled in connection with a howling detection time by said controlling means.

* * * * *